United States Patent
Von Schoultz

(10) Patent No.: US 7,565,745 B2
(45) Date of Patent: Jul. 28, 2009

(54) NUT CRACKER

(76) Inventor: Erik Von Schoultz, Svartensgatan 28, SE-116 20 Stockholm (SE)

(*) Notice: Subject to any disclaimer, the term of this patent is extended or adjusted under 35 U.S.C. 154(b) by 266 days.

(21) Appl. No.: 11/628,618

(22) PCT Filed: Jun. 8, 2005

(86) PCT No.: PCT/SE2005/000861

§ 371 (c)(1), (2), (4) Date: Dec. 6, 2006

(87) PCT Pub. No.: WO2005/120319

PCT Pub. Date: Dec. 22, 2005

(65) Prior Publication Data

US 2008/0086890 A1 Apr. 17, 2008

(30) Foreign Application Priority Data

Jun. 11, 2004 (SE) .................................. 0401489

(51) Int. Cl.
*A47J 43/26* (2006.01)
*A47J 43/00* (2006.01)

(52) U.S. Cl. .................... 30/120.2; 30/120.4; 99/578; 99/582

(58) Field of Classification Search ..... 30/120.1–120.5, 30/114; D7/680; D8/57; 100/234, 235, 100/125, 233; 99/571–582, 510, 629; 241/DIG. 27, 241/169, DIG. 17, 95, 169.2

See application file for complete search history.

(56) References Cited

U.S. PATENT DOCUMENTS

| 699,529 | A | * | 5/1902 | Hutchinson | 99/577 |
|---|---|---|---|---|---|
| 768,062 | A | * | 8/1904 | Mather | 30/120.4 |
| 1,222,330 | A | * | 4/1917 | Sauvage | 30/120.4 |
| 1,499,653 | A | * | 7/1924 | Hagadorn | 30/120.4 |
| 1,922,515 | A | * | 8/1933 | Wood | 99/572 |
| 2,285,355 | A | * | 6/1942 | Pricer | 99/581 |
| 2,373,057 | A | * | 4/1945 | Shinn | 100/233 |
| 4,498,385 | A | * | 2/1985 | Manley | 100/233 |
| 4,554,737 | A | | 11/1985 | Bartels | |
| 4,641,430 | A | | 2/1987 | Hahn | |
| 5,092,231 | A | * | 3/1992 | Smith | 99/572 |
| D341,841 | S | * | 11/1993 | Mick | D15/123 |

FOREIGN PATENT DOCUMENTS

| EP | 0943277 A1 | 9/1999 |
|---|---|---|
| GB | 308486 A | 3/1929 |
| GB | 592232 A | 9/1947 |

\* cited by examiner

*Primary Examiner*—Boyer D. Ashley
*Assistant Examiner*—Laura M. Lee
(74) *Attorney, Agent, or Firm*—Jeffrey S. Melcher; Manelli Denison & Selter PLLC

(57) ABSTRACT

A nut cracker having a cup, a lever and a handle. The cup having a wall and a bottom defining an internal, generally conical space sized to contain a nut placed therein such that when the nut is cracked pieces of the shell are contained within the cup. The lever is provided in a slot through the wall of the cup such that the lever can be pivoted towards the portion of interior surface of the wall to crush a nut between a surface of the lever and a portion of interior surface of the wall opposite the lever. The handle is pivotally attached to the top of the cup such that when the handle is moved in a direction towards the cup the lever surface moves towards the portion of the interior surface of the wall.

4 Claims, 3 Drawing Sheets

NUT CRACKER

TECHNICAL FIELD OF THE INVENTION

The present invention relates to a nut cracker that comprises a cup with an internal, generally conical space, a lever provided adjacent to the conical space, said lever being pivotally attached to the cup, and a handle that is pivotally attached to the cup.

PRIOR ART

From U.S. Pat. No. 4,554,737 a nut cracker is previously known, said nut cracker having a cone shaped cup for receiving a nut. In principle the cone constitutes two portions that are pivotal relative to each other, said portions being equipped with handles. The size of the internal space that is defined by the cone may be varied by activation of the handles. This principle is used to crack nuts that are placed in the internal space.

It is also known a nut cracker on the market that is marketed under the trade mark DROSSELMEYER. The nut cracker according to the present invention is a further development of this nut cracker. The known nut cracker DROSSELMEYER comprises a cup with an internal conical space to receive a nut. By means of a lever mechanism the nut received in the conical space is subjected to a compressive force and the shell of the nut is crushed. A handle of the lever mechanism is attached to the cup by means of a pin that is received in a hole in the handle. The pin is received in grooves in the cup, said grooves being open downwardly. When using the nut cracker it might happen, during certain circumstances that the pin is removed from its position in the grooves.

OBJECTS AND FEATURES OF THE INVENTION

A primary object of the present invention is to present a nut cracker of the type defined above, where the components of the nut cracker, in respect of industrial engineering, may be manufactured in a very favourable way.

A further object of the present invention is that all components may be manufactured by moulding, e.g. in zink or plastic.

Still a further object of the present invention is to prevent that the handle and the lever unintentionally are void of their cooperating engagement with each other.

At least the primary object of the present invention is realized by means of a nut cracker that has been given the features of the pending independent claim 1. Preferred embodiments of the invention are defined in the dependent claims.

BRIEF DESCRIPTION OF THE DRAWINGS

Below an embodiment of the invention will be described, reference being made to the accompanying drawings, where.

DETAILED DESCRIPTION OF A PREFERRED EMBODIMENT OF THE INVENTION

Figure 1:
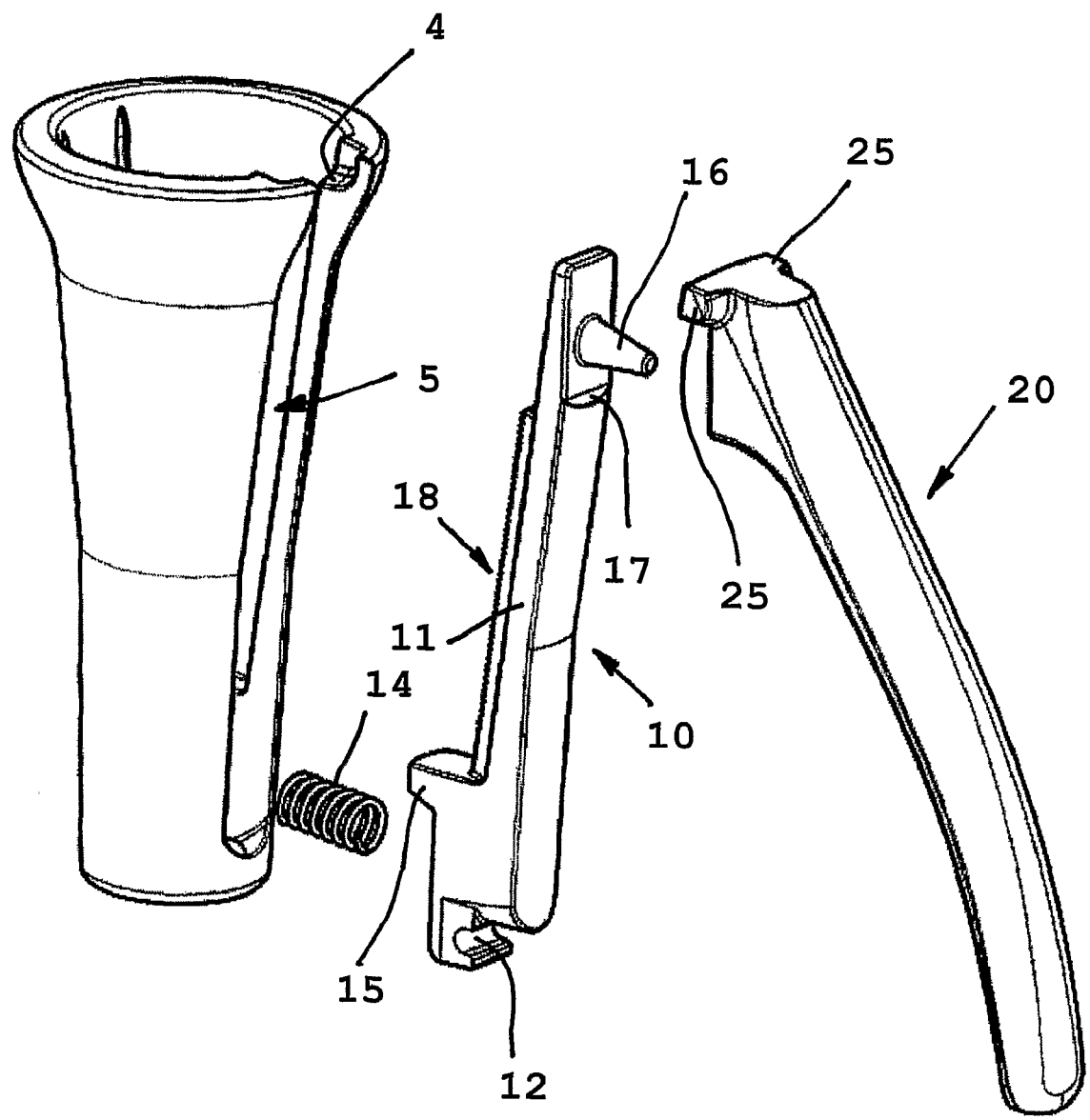
FIG. 1 shows an exploded view of a nut cracker according to the present invention.
Figure 2:
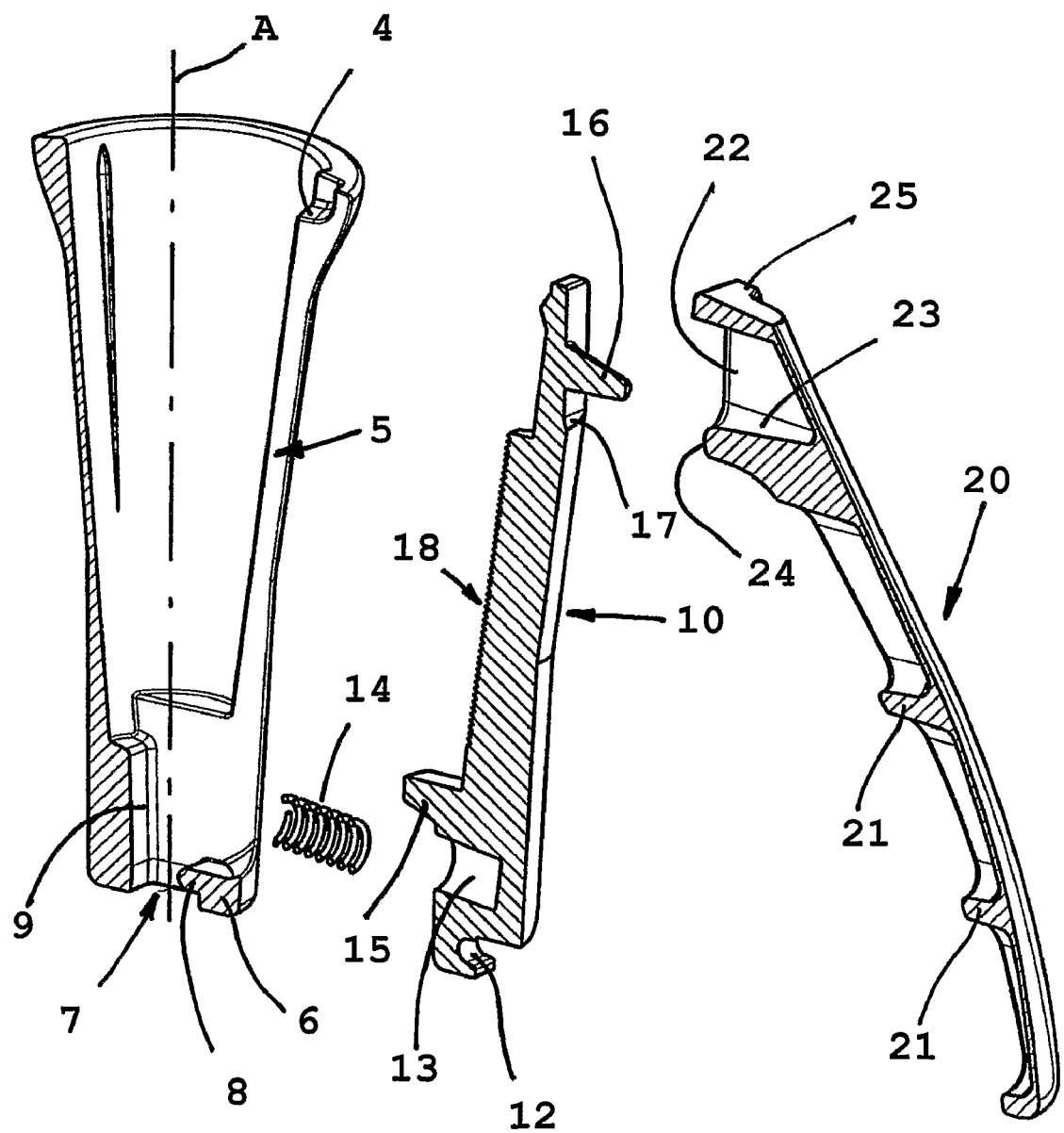
FIG. 2 shows an exploded view of a nut cracker according to a corresponding way as in FIG. 1, however the components of the nut cracker being cut in half longitudinally and only one half being shown.
Figure 3:
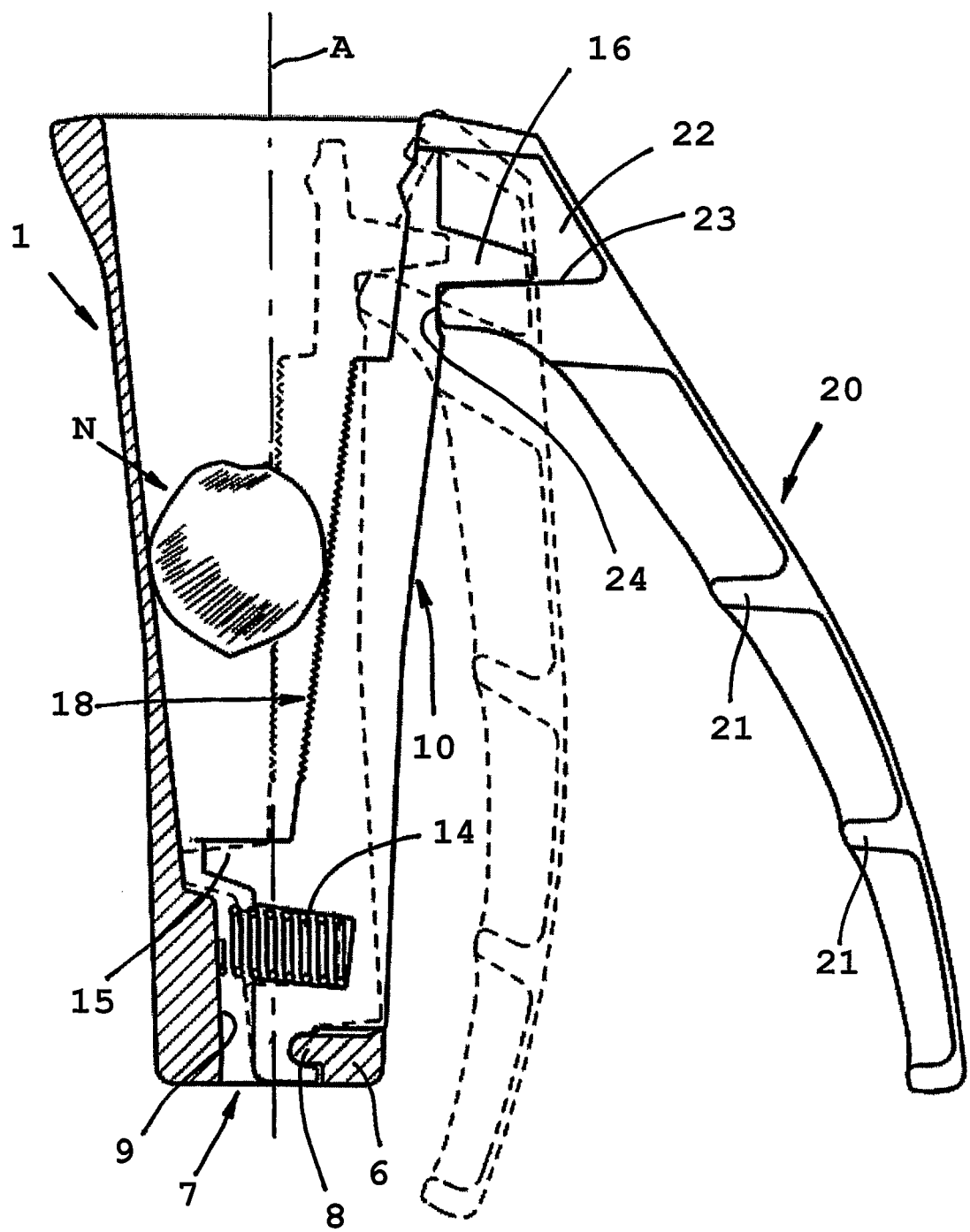
FIG. 3 shows a section through the nut cracker according to the present invention, the components of the nut cracker being assembled to a functioning unit.

The nut cracker according to present invention, shown in FIGS. 1-3, comprises a generally conical cup 1. In order to achieve a proper function of the nut cracker it is necessary that the internal space 3, defined by the cup 1, is conical, more precisely slightly conical. The cup 1 defines an axial direction A that is illustrated in FIG. 2 by means of a dash dotted line. This axial direction A also constitutes the longitudinal centre axis of the cup 1.

As is most evident from FIGS. 1 and 2 the wall of the cup 1 is equipped with a slot 5 that extends substantially along the axial direction A of the cup 1. In the shown embodiment the slot 5 is open upwardly while it is restricted downwardly by a material portion 6 of the cup 1. Adjacent to the open end of the slot 5 supporting pockets 4 are provided in the wall of the cup 1. These supporting pockets 4 are open in a direction towards the open end of the cup 1. In its bottom portion the cup 1 is equipped with a central hole 7. Adjacent to the hole 7 the material portion 6 is equipped with a tongue 8. Opposite to the tongue 8 the cup 1 is equipped with an internal supporting surface 9.

The nut cracker according to the present invention also comprises an oblong lever 10 that is intended to be received in the slot 5, i.e. the slot 5 and the lever 10 have mutually adapted dimensions. As is most evident from FIGS. 1 and 2 the lever 10 comprises a generally oblong base body 11 with means at the lower end of the lever 10, see FIGS. 1 and 2, for cooperation with the cup 1 and with means at the upper end of the lever 10, see FIGS. 1 and 2, for cooperation with a handle that will be described below. Thus, the lever 10 has a recess 12 at its lower end, a seat 13 for a spring 14 and a stopper 15 in the shape of a projection. In the area of its upper end the lever 10 has a male part in the shape of a peg 16, that protrudes from the base body 11, in opposite direction compared to the stopper 15. Adjacent to the peg 16, and on the same side, the base body 11 is equipped with an abutment surface 17. An intermediate portion of the base body 11 has a serrated portion 18, said serrated portion 18 being located on the same side as the stopper 15, i.e. facing towards the interior of the cup 1.

The nut cracker according to present invention also comprises a handle 20 that generally has a slightly curved shape. This has turned out to be ergonomically advantageous. As is evident from FIGS. 2 and 3 the handle 20 is equipped with a number of reinforcement ribs 21 that are distributed along the length of the handle 20. The reinforcement ribs 21 are located on the side of the handle 20 that faces towards the cup 1 when the handle 20 is mounted. In the area of its upper end the handle 20 is equipped with a female part in the shape of a recess 22, said recess 22 having a lower supporting surface 23. Adjacent to the lower supporting surface 23 the handle 20 also has a contact surface 24 that is located at the open end of the recess 22. In the area of its upper end the handle 20 also has pivots 25 that are located on both sides of the handle 20.

The nut cracker according to the present invention is formed by assemblage of the cup 1, the lever 10 and the handle 20. When mounting the lever 10 in the slot 5 of the cup 1 the lower end of the lever 10 is hitched to the bottom portion of the cup 1. In connection therewith the recess 12 of the lever 10 is brought to receive the tongue 8 of the material portion 6. The spring 14, received in the seat 13 will abut the internal supporting surface 9 of the cup 1. The lever 10 is now pivotally mounted in the slot 5, the pivoting being effected around the tongue 8.

When mounting the handle 20 the male part of the lever 10 is brought to cooperate with the female part of the handle 20, i.e. the peg 16 is received in the recess 22. The pivots 25 of the handle 20 are placed in the supporting pockets 4 and the handle 20 has assumed the position in FIG. 3 that is shown in unbroken lines. Also the lever 10 has assumed the position in FIG. 3 that is shown in unbroken lines. The positions of the lever 10 and the handle 20 that are shown in unbroken lines constitute the initial positions of these complements. In this connection it should be noted that the handle 20 is not allowed to be displaced upwards in FIG. 3 since the peg 16 of the lever 10 contacts the upper supporting surface 23 of the handle 20. The lever 10 is not allowed to be displaced upwards in FIG. 3 since the recess 12 is in engagement with the tongue 8. The nut cracker according to the present invention is now ready for use.

The nut cracker according to the present invention functions in the following way. A nut N is placed in the cup 1 by allowing the nut to fall down into the cup 1 via its open end. In FIG. 3 is shown how a nut N is placed in the cup 1. In order to activate the nut cracker according to the present invention the user grabs the cup 1 and the handle 20 by one of his/her hands. Then the user urges the handle 20 in direction towards the cup 1. In connection therewith the upper portion of the handle 20 will provide a displacement of the lever 10. When the handle 20 is pivoted around its pivots 25 the contact surface 24 will displace the upper portion of the lever 10 inwards and the lower end of the lever 10 is pivoted around the tongue 8. Both the handle 20 and the lever 10 are thereby displaced from the position in unbroken lines to the position in dotted lines in FIG. 3. By studying FIG. 3 is realized that the lever 10 compresses the nut N in order to crack the shell of the nut N. It should be mentioned that since the shell of the nut N is cracked when the nut N is in the cup 1 pieces of the shell will not fly around and make a litter. In this connection it should also be mentioned that the serrated portion 18 guarantees that the nut N will not glide relative to the cup 1 during the compression.

When the lever 10 has assumed the position according to the dotted lines in FIG. 3 the projecting stopper 15 will enter into abutment against the inner of the cup 1, whereby an end position of the lever 10 is defined. The position of the handle 20, shown by dotted lines in FIG. 3, also constitutes an end position of the handle 20. Now the user releases the handle 20 and both the lever 10 and the handle 20 will return to the positions shown by unbroken lines in FIG. 3. The return of the lever 10 is taken care of by the spring 14, the lever 10 in its turn returns the handle 20 to its initial position. Then the user pours out the mixture of pieces of shell and core from the cup 1, preferably in his/her palm. The core may now be separated and the pieces of shell may be poured in a bowl or the like.

The invention claimed is:

1. A nut cracker comprising:
   a cup having a wall and a bottom defining an internal, generally conical space constructed and arranged to contain a nut placed therein such that when the nut is cracked pieces of the shell are contained within the cup, the wall having an interior surface;
   an essentially axial extending slot through the wall of the cup, the slot having a closed end adjacent the bottom of the cup and an open end adjacent an open end of the cup;
   supporting pockets provided in the wall of the cup adjacent the open end of the slot;
   the bottom of the cup having a hole and tongue;
   the interior surface of the wall having a supporting surface opposite the tongue;
   a lever provided in the slot having a lower end, an upper end, a lever surface facing towards a portion of the interior surface of the wall opposite the slot, a recess adjacent the lower end of the lever, a peg disposed adjacent the upper end of the lever protruding from the lever in a direction away from the cup, and an abutment surface facing away from the cup adjacent the upper end of the lever, the tongue disposed within the recess of the lever such that the lower end of the lever is pivotally attached adjacent the bottom of the cup so that the lever can be pivoted towards the portion of interior surface of the wall to crush a nut between the lever surface and the portion of interior surface of the wall;
   a spring disposed between the lever and the supporting surface of the wall to bias the lever surface away from the portion of the interior surface of the wall; and
   a handle having an upper end, pivots on opposite sides of handle adjacent the upper end of the handle, a recess adjacent the upper end of the handle having a lower support surface, and a contact surface adjacent the upper end of the handle, the pivots being disposed within the supporting pockets such that the handle is pivotally attached adjacent a top of the cup, the peg being disposed within the recess and a side surface of the peg contacting the lower support surface of the handle to prohibit displacement of the handle in an axial direction away from the bottom of the cup, wherein when the handle is pivoted in a direction towards the cup the contact surface of the handle contacts the abutment surface of the lever to force the lever surface to pivot towards the portion of the interior surface of the wall.

2. Nut cracker according to claim 1, wherein the lever surface is serrated.

3. Nut cracker according to claim 1, the lever further comprising a stopper near the lower end of the lever and projecting from the lever in the direction of the portion of the interior surface of the wall to limit how far the lever can pivot into the interior of the cup.

4. Nut cracker according to claim 1, the supporting pockets being open in a direction towards the open end of the cup.

* * * * *